J. CARROLL.
ASH SIFTER.
APPLICATION FILED APR. 27, 1918.
1,293,330.
Patented Feb. 4, 1919.
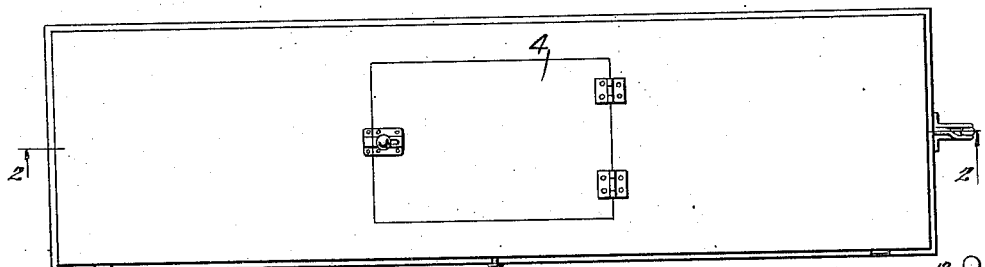
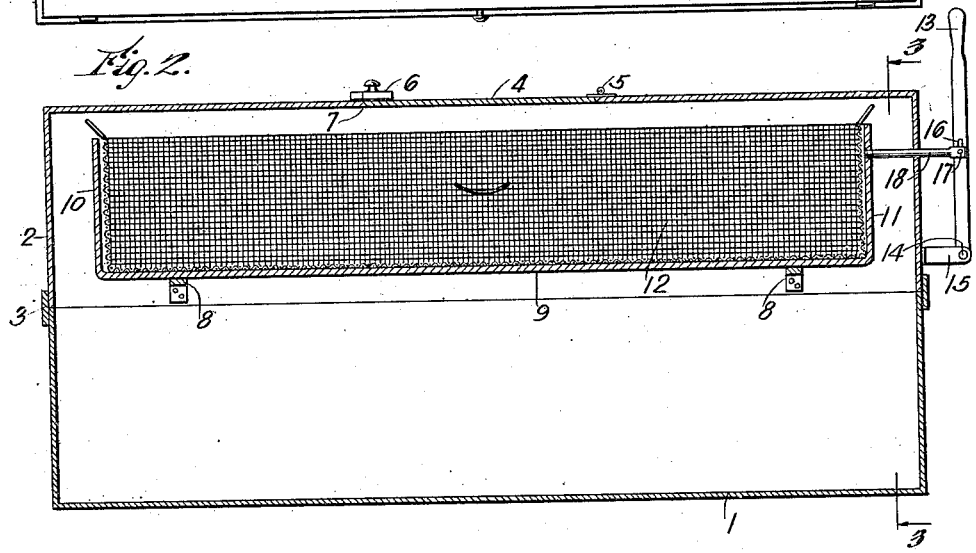
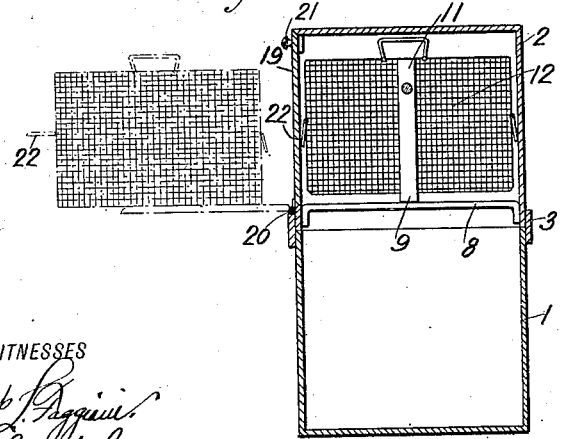
WITNESSES
INVENTOR
Joseph Carroll
BY
ATTORNEYS

UNITED STATES PATENT OFFICE.

JOSEPH CARROLL, OF BROOKLYN, NEW YORK.

ASH-SIFTER.

1,293,330.  Specification of Letters Patent.  Patented Feb. 4, 1919.

Application filed April 27, 1918. Serial No. 231,125.

*To all whom it may concern:*

Be it known that I, JOSEPH CARROLL, a citizen of the United States, and a resident of the city of New York, borough of Brooklyn, in the county of Kings and State of New York, have invented a new and Improved Ash-Sifter, of which the following is a full, clear, and exact description.

This invention relates to ash sifters and has for an object the provision of an improved construction whereby ashes may be sifted properly and the usual dust or loose ashes separated by the sifting operation confined and caused to settle in a suitable receptacle without being deposited on surrounding articles.

Another object in view is to provide a simple construction wherein the ashes may be easily supplied, the cinders removed and the siftings also removed.

In the accompanying drawing:

Figure 1 is a top plan view of a sifter disclosing an embodiment of the invention.

Fig. 2 is a longitudinal vertical section through Fig. 1 on line 2—2.

Fig. 3 is a transverse sectional view through Fig. 2 on line 3—3.

Referring to the accompanying drawing by numerals 1 indicates a box or container for the siftings, said box being rectangular and preferably of the same size as the housing 2 arranged thereon, said housing being held in place by a flanged strip 3 secured to the housing and slidingly fitting over the container 1. It will be noted that the container 1 is closed at the bottom, sides and ends, but open at the top, while the housing 2 is closed at the top, sides and ends and open at the bottom, except that the housing 2 has a door 4 hinged at 5 and held normally closed by a catch 6. It will be observed that the door 4 has a beveled connection 7 which preferably extends entirely around the door so that when the door is closed it will be sufficiently tight to prevent any of the dust or siftings to pass therethrough.

A plurality of cross bars 8 are secured in any suitable manner to the side walls of the housing 2 for supporting a longitudinally arranged cage support 9. The cage support 9 is provided with longitudinal sections resting on the transverse supports or bars 8 and 9 and with upstanding end sections 10 and 11. The cage 12 rests on the supporting bar 9 and loosely fits between the end sections 10 and 11. This cage is made completely of wire mesh of any desired gage and is open at the top, but closed elsewhere so that the ashes including the cinders may be dumped therein through the opening normally closed by door 4. After the ashes have been dumped into the cage 12 said cage is moved back and forth quickly by the operation of the lever 13, said lever being pivoted at 14 to a bracket 15 secured to the housing 2. Bracket 15 is provided with an opening 16 in the form of a slot provided with a pin 17, said pin also passing through the bifurcated rod 18, which rod is secured to the section 11 in any suitable manner, as for instance by being threaded therein. Preferably the rod 18 is comparatively short so as to allow only a short back and forth movement, usually from one to three inches. This quick back and forth movement will cause an abrupt change of direction to the cinders and ashes and thereby cause the same to become separated so that the ash siftings will fall through the wire mesh cage while the cinders and other large matter will remain in the cage 12.

After the sifting operation the device is allowed to rest quietly for a short time until the ash siftings have settled and then the side door 19 is opened, said door being hinged at 20 and normally held closed by a catch 21 of any desired kind. This side door is preferably not quite as long as the housing 2, but amply long enough to close the opening through which the cage 12 is passed. When the door 19 is opened the handle 22 of the cage 12 is grasped and the cage removed from off the supporting bars 8. After the cage has been dumped it is again placed in position and the sifter is ready for a second operation unless the container 1 is filled with siftings. In this event the housing 2 is bodily raised off the container 1 and placed to one side after which the container 1 is dumped at a convenient point and housing 2 replaced.

By providing all the parts sufficiently tight to prevent the escape of any of the siftings the undesirable feature of ash sifting is eliminated. By providing an arrangement whereby the cage is moved only a short distance in either direction a maximum efficiency is secured as there is no waste energy utilized in moving the cage and its contents more than necessary.

What I claim is:

1. An ash sifter comprising a housing having a doorway in the side, a wire cage movable through said doorway, a substantially U-shaped support for said cage arranged so that the ends of the support will engage the ends of the cage, said support being independent of the cage and extending substantially parallel with the doorway so that said cage may be placed thereon or moved therefrom at will, a plurality of rods for supporting said U-shaped support, and means connected with one of the ends of said U-shaped support extending through said housing for moving the support and cage and thereby causing a sifting action.

2. An ash sifter comprising a container having an open upper face, a housing having an open lower face fitting against the container in such a manner that the openings will register, said housing having doorways in the upper part and in one side, a door for each doorway, the upper doorway being used to insert the ashes to be sifted, a cage arranged in said housing and removable through the side doorway, a permanently positioned supporting member having upstanding ends for shaking said cage, a supporting structure for said supporting member, a rod connected to one end of said supporting member extending through said housing, and manually operated means connected with said rod for reciprocating the same.

JOSEPH CARROLL.

Copies of this patent may be obtained for five cents each, by addressing the "Commissioner of Patents, Washington, D. C."